United States Patent
Brannon et al.

(10) Patent No.: US 7,207,386 B2
(45) Date of Patent: Apr. 24, 2007

(54) METHOD OF HYDRAULIC FRACTURING TO REDUCE UNWANTED WATER PRODUCTION

(75) Inventors: Harold Dean Brannon, Magnolia, TX (US); William Dale Wood, Spring, TX (US); Donald L. Purvis, Mustang, OK (US); Allan Ray Rickards, Tomball, TX (US); Christopher John Stephenson, Houston, TX (US)

(73) Assignee: BJ Services Company, Houston, TX (US)

( * ) Notice: Subject to any disclaimer, the term of this patent is extended or adjusted under 35 U.S.C. 154(b) by 0 days.

(21) Appl. No.: 10/863,731

(22) Filed: Jun. 9, 2004

(65) Prior Publication Data

US 2005/0016732 A1 Jan. 27, 2005

Related U.S. Application Data

(60) Provisional application No. 60/480,063, filed on Jun. 20, 2003.

(51) Int. Cl.
*E21B 43/267* (2006.01)

(52) U.S. Cl. .............................. 166/280.2; 166/280.1; 166/308.1; 166/308.3; 507/924

(58) Field of Classification Search ............. 166/280.1, 166/280.2, 308.1, 308.2, 308.3; 507/924
See application file for complete search history.

(56) References Cited

U.S. PATENT DOCUMENTS 2,869,642 A * 1/1959 McKay et al. ........... 166/250.1
3,121,464 A * 2/1964 Huitt et al. ............... 166/280.1
3,127,937 A 4/1964 McGuire, Jr. et al.
3,151,678 A 10/1964 Hanson et al.
3,159,217 A 12/1964 Hanson
3,245,468 A * 4/1966 Huitt et al. ............... 166/280.1
3,335,797 A 8/1967 Braunlich, Jr.
3,372,752 A 3/1968 Prater
3,399,727 A 9/1968 Graham et al.
3,417,819 A * 12/1968 Wyllie ..................... 166/280.1
3,497,008 A 2/1970 Graham et al.

(Continued)

FOREIGN PATENT DOCUMENTS

EP 0 773 343 A2 5/1997

(Continued)

*Primary Examiner*—George Suchfield
(74) *Attorney, Agent, or Firm*—Jones & Smith, LLP; John Wilson Jones

(57) ABSTRACT

A method of hydraulically fracturing a hydrocarbon-bearing subterranean formation ensures that the conductivity of water inflow below the productive zone of the subterranean formation is reduced. The method consists of two principal steps. In the first step, a fracture in and below the productive zone of the formation is initiated by introducing into the subterranean formation a fluid, free of a proppant, such as salt water, fresh water, brine, liquid hydrocarbon, and/or nitrogen or other gases. The proppant-free fluid may further be weighted. In the second step, a proppant laden slurry is introduced into the subterranean formation which contains a relatively lightweight density proppant. Either the fluid density of the proppant-free fluid is greater than the fluid density of the proppant laden slurry or the viscosity of the proppant-free fluid is greater than the viscosity of the proppant laden slurry. The method limits undesirable fracture height growth in the hydrocarbon-bearing subterranean formation during the fracturing.

33 Claims, 3 Drawing Sheets

U.S. PATENT DOCUMENTS

| | | | |
|---|---|---|---|
| 3,709,300 A | | 1/1973 | Pye |
| 3,954,142 A | | 5/1976 | Broaddus et al. |
| 4,078,609 A | * | 3/1978 | Pavlich ................ 166/271 |
| 4,109,721 A | * | 8/1978 | Slusser ................ 166/280.2 |
| 4,442,897 A | * | 4/1984 | Crowell ................ 166/280.2 |
| 4,509,598 A | | 4/1985 | Earl et al. |
| 4,850,430 A | | 7/1989 | Copeland et al. |
| 4,887,670 A | * | 12/1989 | Lord et al. ................ 166/281 |
| 4,923,714 A | * | 5/1990 | Gibb et al. ................ 427/221 |
| 4,969,523 A | | 11/1990 | Martin et al. |
| 5,069,283 A | | 12/1991 | Mack |
| 5,074,359 A | | 12/1991 | Schmidt |
| 5,465,792 A | | 11/1995 | Dawson et al. |
| 5,531,274 A | | 7/1996 | Bienvenu, Jr. |
| 5,558,160 A | | 9/1996 | Tudor |
| 5,735,349 A | | 4/1998 | Dawson et al. |
| 6,059,034 A | | 5/2000 | Rickards et al. |
| 6,169,058 B1 | | 1/2001 | Le et al. |
| 6,228,812 B1 | | 5/2001 | Dawson et al. |
| 6,330,916 B1 | | 12/2001 | Rickards et al. |
| 6,364,018 B1 | | 4/2002 | Brannon et al. |
| 6,491,099 B1 | | 12/2002 | Di Lullo Arias et al. |
| 6,508,305 B1 | | 1/2003 | Brannon et al. |
| 6,749,025 B1 | | 6/2004 | Brannon et al. |
| 6,772,838 B2 | | 8/2004 | Dawson et al. |
| 6,776,235 B1 | | 8/2004 | England |
| 6,860,328 B2 | * | 3/2005 | Gonzalez et al. ........ 166/280.1 |
| 2002/0048676 A1 | * | 4/2002 | McDaniel et al. .......... 428/404 |
| 2003/0102128 A1 | | 6/2003 | Dawson et al. |
| 2004/0040708 A1 | | 3/2004 | Stephenson et al. |

FOREIGN PATENT DOCUMENTS

WO     WO 2004/083600 A1     9/2004

* cited by examiner

METHOD OF HYDRAULIC FRACTURING TO REDUCE UNWANTED WATER PRODUCTION This application claims the benefit of U.S. patent application Ser. No. 60/480,063, filed Jun. 20, 2003.

FIELD OF THE INVENTION

This invention relates to a method of treating subterranean formations and, more specifically, to hydraulic fracturing treatments for subterranean formations. Use of the method of the invention reduces unwanted water production which ordinarily may result during hydraulic fracturing.

BACKGROUND OF THE INVENTION

In the production of fluids from subterranean formations, it has been a long-standing practice to hydraulically fracture the formation from a wellbore to enhance the flow of fluids from the formation into the wellbore. Hydraulic fracturing is typically employed to stimulate wells which produce from low permeability formations.

During hydraulic fracturing, a fracturing fluid is injected into the wellbore at high pressures to create fractures in the rock formation surrounding the bore. The fractures radiate outwardly from the wellbore, typically from a few to hundreds of meters, and extend the surface area from which oil or gas drains into the well.

In the absence of suitable boundaries, it is not uncommon during hydraulic fracturing for the fracture to grow out of the zone of productive interest and proceed into a zone of non-productive interest, including zones containing water. Most often, such problem areas are associated with non-productive fracture growth below the zone of productive interest. Many different approaches have been used to minimize or avoid the occurrence of such phenomena including the development of modified perforating schemes and reduction in treatment rates. Another approach has been to use a fracturing fluid which carries a heavy proppant, such as sand. Such methods do not however provide a satisfactory solution to the production of unwanted water.

The problem of undesirable fracture height growth may particularly be a problem when practicing slickwater treatments, in light of the poor transport properties of slickwater fluids which allow proppants to settle, forming a "proppant bank" at the bottom of the created fracture. Unfortunately, such proppant banks in contact with water producing zones often provide a high permeability conduit for unwanted water production. A need exists to mitigate such occurrences.

SUMMARY OF THE INVENTION

The invention relates to a method of hydraulically fracturing a hydrocarbon-bearing subterranean formation. The conductivity of water inflow below the productive zone of the subterranean formation is reduced through the method of the invention.

The method consists of two critical steps. In the first step, a proppant-free fluid is introduced into the subterranean formation for a time and at an injection rate sufficient to initiate a fracture in and below the productive zone of the formation. In a preferred mode, the proppant-free fluid may comprise salt water, fresh water, brine, liquid hydrocarbon, and/or nitrogen or other gases. The proppant-free fluid may further be weighted. In the second step, a proppant laden slurry is introduced into the subterranean formation. The proppant laden slurry preferably contains a relatively lightweight density proppant. Typically, either the fluid density of the proppant-free fluid is greater than the fluid density of the proppant laden slurry; or the viscosity of the proppant-free fluid is greater than the viscosity of the proppant laden slurry.

Where the fluid density of the proppant-free fluid is greater than the fluid density of the proppant laden slurry, the method of the invention further limits undesirable fracture height growth in the hydrocarbon-bearing subterranean formation during the fracturing. The fracture, initiated by the introduction of the proppant-free fluid, grows below the productive zone of the formation, the proppant-free slurry migrating to the lower extremities of the initiated fracture by gravity segregation. The density differential of the proppant-free fluid and the proppant laden slurry allows the proppant laden slurry to override the dense proppant-free fluid, thereby causing a separation of the proppant laden slurry from the proppant-free fluid.

BRIEF DESCRIPTION OF THE DRAWINGS

In order to more fully understand the drawings referred to in the Detailed Description of the Preferred Embodiments, a brief description of the drawings is presented, in which.

DETAILED DESCRIPTION OF THE PREFERRED EMBODIMENTS

Figure 1:
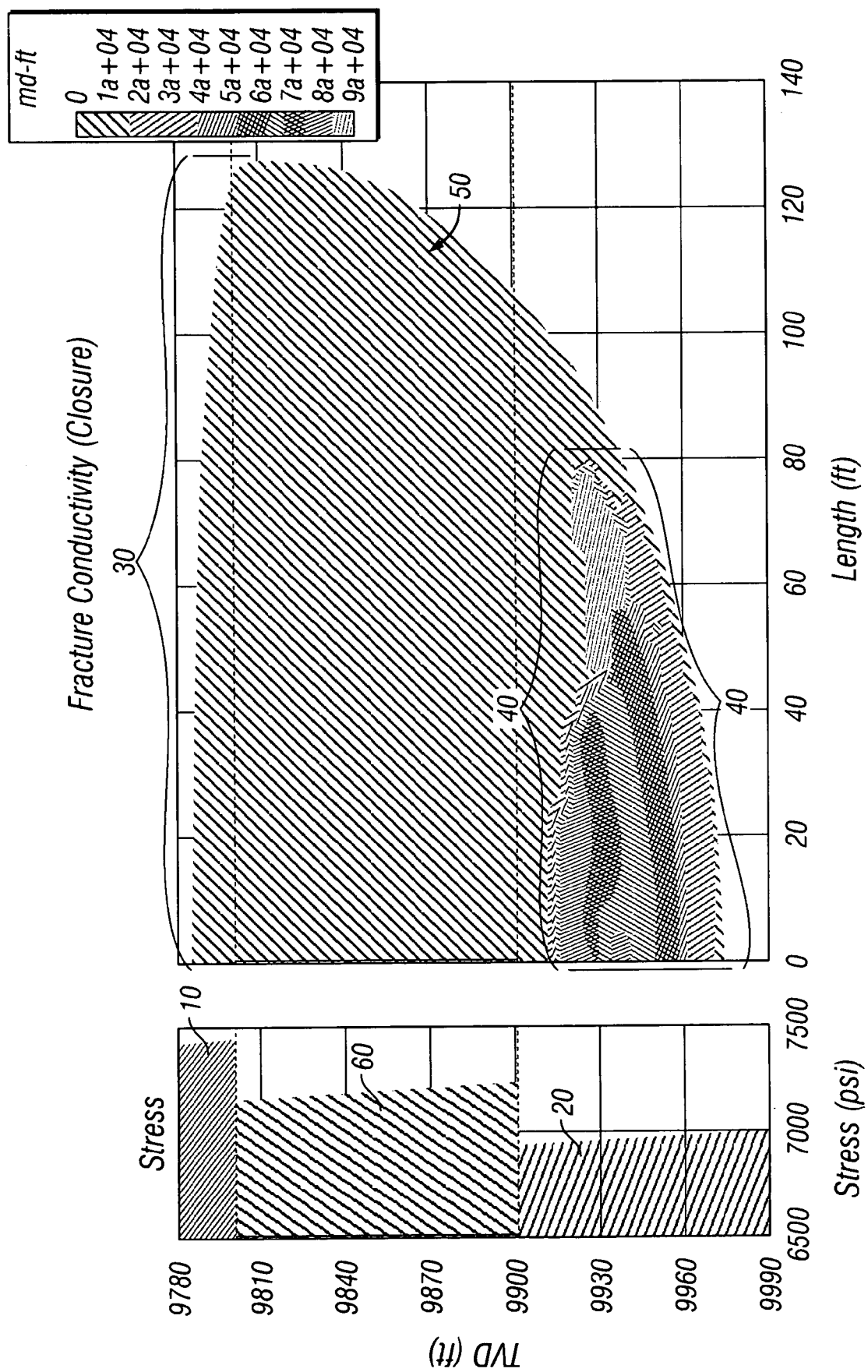
FIGS. 1 and 2 are 2D depictions of a fracture, after closure of the fracture, initiated with a fracturing fluid containing sand as the proppant and a brine slickwater fluid.

In the first step of the method of the invention, a fluid is injected into the subterranean formation which is void of a proppant. The injection of this fluid, often referred to as a "pre-pad," serves to open the main body of the fracture and develops a relatively large radius of curvature near the wellbore. The pre-pad has physical properties which lead the subsequently pumped proppant laden slurry of lower density and/or viscosity to override and stay substantially separated from it. Thus, the proppant avoids migration into the lower non-productive zone of the formation.

The injection rate is typically between from about 5 to about 150 barrels per minute. Typically, the volume of pre-pad is determined by the constraints of the fracture design and may range from 20 to many hundreds of barrels.

The proppant-free fluid is typically injected into the subterranean formation at ambient surface temperature and at pressures typically less than 10,000 psi. It also being understood that core and/or layer materials may be selected by those of skill in the art to meet and withstand anticipated downhole conditions of a given application.

The proppant-free fluid typically may be salt water, fresh water, brine, liquid hydrocarbon and/or nitrogen or other gases or any other pre-pad pumping solution known to those of skill in the art. For instance, the proppant-free fluid may be a linear or crosslinked fluid such as a polymeric dispersion of hydrophilic water swellable particles crosslinked so that they are water insoluble, but capable of swelling in the presence of relatively small amounts of water. Such polymeric particulates swell and reduce fluid loss to the formation during the treatment.

In a preferred embodiment, the proppant-free fluid contains a water control additive and/or a relative permeability modifier. Suitable as fluid loss additives include corn starch (especially 100 mesh corn starch) as well as surfactants comprising an alkyl sarcosinate having from about 12 to 24 carbon atoms in the alkyl group; the latter disclosed in U.S. Pat. No. 6,491,099, herein incorporated by reference. Particularly preferred as water control additive is AquaCon, a product of BJ Services Company. See U.S. Pat. No. 6,228, 812. Incorporation of such water control additives serves to impede the flow of water through the created but unpropped fracture below the productive zone. When present, the total volume of fluid loss additive(s) in the proppant-free fluid is between from about 0.1 to about 5, preferably about 2, volume percent.

The relative permeability modifier (RPM) for use in the invention is any substance known in the art that can impede the production of water. Suitable as the RPM are homopolymers and copolymers of acrylamide, optionally having been sulfonated or quaternized, polyvinylalcohol, polysiloxane, or a hydrophilic polymer selected from natural gums and chemically modified derivatives thereof. Such RPMs include those disclosed in U.S. Pat. Nos. 6,228,812, 5,735, 349; 6,169,058, and U.S. patent application Ser. No. 10/386, 160, filed on Mar. 10, 2003, all of which are herein incorporated by reference.

Most often the RPM is hydrophilic having the ability to remain hydrated in the formation waters and simultaneously having an affinity to adsorb onto the solid formation material. Such RPMs typically have weight average molecular weights ranging from about 20,000 to about 20,000,000 g/mole, preferably from about 100,000 to about 5,000,000 g/mole, most preferably from about 250,000 to about 2,000, 000 g/mole.

Further, the term RPM as used herein shall further refer to those RPM systems as disclosed in U.S. patent application Ser. No. 10/386,160, filed on Mar. 10, 2003, herein incorporated by reference. In addition to the molecular weight, the RPMs must also have specific sites that allow interaction with the organosilicon compound. Such RPM systems comprise a RPM (as defined above) and an organosilicon compound In a preferred mode, the organosilicon compound is of the formula:

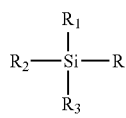

(I)

wherein R is a halogen, hydrogen, or an amine radical which can be substituted with hydrogen, organic radicals, or silyl groups, $R_1$ is hydrogen, an amine, or an organic radical having from 1 to 50 carbon atoms, and $R_2$ and $R_3$ are hydrogen or the same or different halogens, alkyl, alkenyl, aryl or amines having 1 to 50 carbon atoms; or

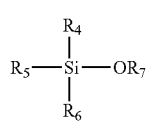

(II)

wherein $R_4$, $R_5$ and $R_6$ are independently selected from hydrogen, amine, halogen, alkoxide, and organic radicals having from 1 to 50 carbon atoms, provided not all of $R_4$, $R_5$ and $R_6$ are hydrogen, and $R_7$ is an organic radical having from 1 to 50 carbon atoms, preferably $R_7$ is selected from amine, alkyl, alkenyl, and aryl groups having from 1 to 18 carbon atoms.

In addition to the hydrophillic swelling polymers, the proppant-free fluid may contain a hydrophilic polymer further include natural gums such as guar, carrageenan, gum Arabic, gum ghatti, karaya, tragacanth, pectin, starch, locust bean gum, scleroglucan, tamarind and xanthan gums and any chemically modified derivatives of these gums including derivatives of cellulose such as the pendent derivatives hydroxyethyl, hydroxypropyl, hydroxypropylcarboxymethyl, hydroxyethylcarboxymethyl, carboxymethyl or methyl or a derivative thereof.

Further, the proppant-free fluid may contain a weighting material in order to impart higher density to the fluid. Suitable weighting materials are those which have one or more water soluble calcium salts (typically calcium halide salts such as $CaCl_2$, etc.) dissolved therein. Where the proppant-free fluid is a brine, the density of the weighted brine will generally be in the range of from about 10 to about 18 lb/gal, preferably from about 15 to about 18 lb/gal. The high density proppant-free fluids can suitably also contain other weighting materials known in the art such as other water soluble salts like sodium salts, such as sodium chloride, sodium bromide, etc.; zinc salts, such as zinc chloride, zinc bromide, etc.; and sodium, potassium and cesium salts of formates and the like. However, in those instances wherein zinc salts such as zinc chloride or bromide are to be included, it is generally advisable and preferable to limit the amount thereof to a maximum level of about 2 weight percent or less (based upon the total weight of the brine composition) in order to minimize the risks of zinc sulfide precipitation which may otherwise occur within the formation in connection therewith. Other suitable weighting materials include ground glass, glass powder, as well as fiberglass.

The pre-pad pumping treatment is followed by an injection of a proppant-laden slurry. The propping agents are normally used in concentrations between about 1 to 18 pounds per gallon of fracturing fluid composition, but higher or lower concentrations can be used as required. Typically, from about 2,000 to about 4,000 barrels of proppant laden slurry containing a total of about 100,000 to about 350,000 pounds of proppant is pumped into the formation. The proppant-laden slurry may be pumped into the formation in successive stages, if desired.

Typically, the proppant-laden slurry is injected into the formation at ambient surface temperature and at pressures usually less than 10,000 psi. However, these stated conditions are exemplary only.

The proppant-laden slurry is pumped at a rate sufficient to place the proppant into the fracture and form a proppant bank. During the actual pumping the pH may be adjusted by the addition of a buffer, followed by the addition of the enzyme breaker, crosslinking agent, and other additives if required. After deposition, the proppant material serves to hold the fracture open. For reasons apparent below, the proppant-laden slurry typically does not contain a weighting agent.

In the practice of the invention, proppant-laden slurry may be any carrier fluid suitable for transporting a mixture of proppant into a formation fracture in a subterranean well. Such fluids include, but are not limited to, carrier fluids comprising salt water, fresh water, liquid hydrocarbons, and/or nitrogen or other gases. Typically, viscous gels or foams are employed as the fracturing fluid in order to provide a medium that will adequately suspend and transport the solid proppant, as well as to impair loss of fracture fluid to the formation during treatment (commonly referred to as "filterability" or "fluid loss"). As such, viscosity of the fracturing fluid may affect fracture geometry because fluid loss affects the efficiency of a treatment. For example, when the rate of fluid loss to the formation equals or exceeds the rate of injection or introduction of fluid into a fracture, the fracture stops growing. Conversely, when the rate of fluid loss is less than the injection or introduction rate, taken together with other factors, a fracture continues to propagate. Excessive fluid loss thus results in fractures that are smaller and shorter than desired.

In a preferred mode, the proppant is a relatively lightweight or substantially neutrally buoyant particulate materials or a mixture thereof. Such proppants may be chipped, ground, crushed, or otherwise processed to produce particulate material having any particle size or particle shape suitable for use in the methods disclosed herein. Typically, the particle sizes of the proppants employed in the invention range from about 4 mesh to about 100 mesh, alternatively from about 8 mesh to about 60 mesh, alternatively from about 12 mesh to about 50 mesh, alternatively from about 16 mesh to about 40 mesh, and alternatively about 20 to 40 mesh. In one exemplary case, the proppant may be ground walnut shells having a particle size of about 12/20 US mesh size in the first proppant stage and 20/40 US mesh size in the second proppant stage. Such proppants are less subject to settling and can be more easily transported to provide greater effective propped fracture length. Greater effective propped fracture length translates to improved stimulation efficiency, well productivity and, reservoir drainage. Another benefit of using such particulate materials is that the requirements for the mixing equipment are minimized. For instance, when the carrier fluid is a brine, the only requirements on the mixing equipment is that it be capable of (a) mixing the brine (dissolving soluble salts), and (b) homogeneously dispersing in the substantially neutrally buoyant particulate material.

By "relatively lightweight" it is meant that the particulate has a density that is substantially less than a conventional proppant particulate material employed in hydraulic fracturing operations, e.g., sand or having a density similar to these materials. Especially preferred are those particulates having a density less than or equal to 3.25 g/cc. Even more preferred are ultra lightweight particulates having a density less than or equal to 2.25, more preferably less than or equal to 2.0, even more preferably less than or equal to 1.75, most preferably less than or equal to 1.25, g/cc. Preferably, such particulates are selected from ceramics, resin coated ceramics, glass microspheres, sintered bauxite, resin-coated sintered bauxite, aluminum pellets, aluminum needles, or nylon pellets or a mixture thereof. In a particularly preferred embodiment, the particulate is a resin coated ceramic particles or beads or is a synthetic organic particle such as nylon pellets, ceramics (including aluminosilicates such as "CARBOLITE," "NAPLITE" or "ECONOPROP".).

By "substantially neutrally buoyant", it is meant that a particulate has a density sufficiently close to the density of an ungelled or weakly gelled carrier fluid (e.g., ungelled or weakly gelled completion brine, other aqueous-based fluid, or other suitable fluid) to allow pumping and satisfactory placement of the proppant particulate using the selected carrier fluid. For example, urethane resin-coated ground walnut hulls having a density of from about 1.25 to about 1.35 g/cc may be employed as a substantially neutrally buoyant proppant particulate in completion brine having a density of about 1.2 g/cc. It will be understood that these values are exemplary only. As used herein, a "weakly gelled" carrier fluid is a carrier fluid having minimum sufficient polymer, viscosifier or friction reducer to achieve friction reduction when pumped down hole (e.g., when pumped down tubing, work string, casing, coiled tubing, drill pipe, etc.), and/or may be characterized as having a polymer or viscosifier concentration of from greater than about 0 pounds of polymer per thousand gallons of base fluid to about 10 pounds of polymer per thousand gallons of base fluid, and/or as having a viscosity of from about 1 to about 10 centipoises. An ungelled carrier fluid may be characterized as containing about 0 pounds per thousand gallons of polymer per thousand gallons of base fluid.

Such materials are disclosed in U.S. Pat. Nos. 6,364,018, 6,330,916 and 6,059,034, all of which are herein incorporated by reference, and are exemplified by ground or crushed shells of nuts (pecan, almond, ivory nut, brazil nut, macadamia nut, etc); ground or crushed seed shells (including fruit pits) of seeds of fruits such as plum, peach, cherry, apricot, etc.; ground or crushed seed shells of other plants such as maize (e.g. corn cobs or corn kernels), etc.; processed wood materials such as those derived from woods such as oak, hickory, walnut, poplar, mahogany, etc. including such woods that have been processed by grinding, chipping, or other form of particalization. Preferred are ground or crushed walnut shell materials coated with a resin to substantially protect and water proof the shell. Such materials may have a density of from about 1.25 to about 1.35 g/cc, and a bulk density of about 0.67.

Further, the relatively lightweight particulate for use in the invention may be a selectively configured porous particulate, as set forth, illustrated and defined in U.S. Patent Publication No. 20040040708 A1, published on Mar. 4, 2004, herein incorporated by reference.

Also, the relatively lightweight particulate for use in the invention may be a well treating aggregate consisting of a multitude of aggregated components bonded together. The aggregates consist of at least one organic lightweight material (a continuous phase) and at least one weight modifying agent (discontinuous phase). The apparent specific gravity (ASG) of the organic lightweight material is either greater than or less than the ASG of the well treating aggregate.

The weight modifying agent may be a weighting agent having a higher ASG than the organic lightweight material. The presence of the weighting agent renders a well treating aggregate having a ASG greater than the ASG of the organic lightweight material. Alternatively, the weight modifying agent may be a weight reducing agent having a lower ASG than the organic lightweight material. The presence of the weight reducing agent renders a well treating aggregate having a ASG less than the ASG of the organic lightweight material. The volume ratio of the resin to weight modifying agent is approximately 75:25. The aggregate particle diameter is approximately 850 microns. The average diameter of the weight modifying agent particulates is approximately 50 microns.

The compressive strength of the aggregate is greater than the compressive strength of the organic, lightweight material. When hardened, the aggregate exhibits a strength or hardness to prevent deformation at temperatures and/or formation closure stresses where substantially deformable materials generally become plastic and soften. In a preferred embodiment, the weight modifying agent is selected so as to modify or customize the ASG of the aggregate in order to impart to the aggregate the desired ASG.

The amount of weight modifying agent in the well treating aggregate is such as to impart to the well treating aggregate the desired ASG. Typically, the amount of weight modifying agent in the well treating aggregate is between from about 15 to about 85 percent by volume of the well treating aggregate, most preferably approximately about 52 percent by volume.

The particle sizes of the weight modifying agent are preferably between from about 10 to about 200 microns.

The organic lightweight material is preferably a polymeric material, such as a thermosetting resin, including polystyrene, a styrene-divinylbenzene copolymer, a polyacrylate, a polyalkylacrylate, a polyacrylate ester, a polyalkyl acrylate ester, a modified starch, a polyepoxide, a polyurethane, a polyisocyanate, a phenol formaldehyde resin, a furan resin, or a melamine formaldehyde resin. The ASG of the organic lightweight material generally less than or equal to 1.1. In a preferred embodiment the ASG of the material is between about 0.7 to about 0.8.

The amount of organic lightweight material in the aggregate is generally between from about 10 to about 90 percent by volume. The volume ratio of organic lightweight material:weight modifying agent in the aggregate is generally between from about 20:80 to about 85:15 most preferably about 25:75. As an example, using an organic lightweight material having an ASG of 0.7 and a weight modifying agent, such as silica, having an ASG of 2.7, a 20:80 volume ratio would render an aggregate ASG of 2.20 and a 85:15 volume ratio would render an ASG of 1.0; a 75:25 volume ratio would render an ASG of 1.20.

In a preferred mode, the ASG of the well treating aggregate is at least about 0.35. In a most preferred mode, the ASG of the well treating aggregate is at least about 0.70, more preferably 1.0, but not greater than about 2.0.

The weight modifying agent may be sand, glass, hematite, silica, sand, fly ash, aluminosilicate, and an alkali metal salt or trimanganese tetraoxide. In a preferred embodiment, the weight modifying agent is selected from finely ground sand, glass powder, glass spheres, glass beads, ground glass, glass bubbles, borosilicate glass or fiberglass. Further, the weight modifying agent may be a cation selected from alkali metal, alkaline earth metal, ammonium manganese, and zinc and an anion selected from a halide, oxide, a carbonate, nitrate, sulfate, acetate and formate. For instance, the weight modifying agent may include calcium carbonate, potassium chloride, sodium chloride, sodium bromide, calcium chloride, barium sulfate, calcium bromide, zinc bromide, zinc formate, zinc oxide or a mixture thereof.

Glass bubbles and fly ash are the preferred components for the weight reducing agent.

The aggregate are generally prepared by blending the organic lightweight material with weight modifying agent for a sufficient time in order to form a slurry or a mud which is then formed into sized particles. Such particles are then hardened by curing at temperatures ranging from about room temperature to about 200° C., preferably from about 50 to about 150° C. until the weight modifying agent hardens around the organic lightweight material.

In a preferred mode, the organic lightweight material forms a continuous phase; the weight modifying forming a discontinuous phase.

The aggregate exhibits crush resistance under conditions as high as 10,000 psi closure stress. API RP 56 or API RP 60, generally between from about 250 to about 8,000 psi closure stress, in combination with a ASG less than or equal to 2.0, preferably less than or equal to 1.5, to meet the pumping and/or downhole formation conditions of a particular application, such as hydraulic fracturing treatment, sand control treatment.

Further, the aggregate exhibits a Young's modulus of between about 500 psi and about 2,000,000 psi at formation conditions, more typically between about 5,000 psi and about 500,000 psi, more typically between about 5,000 psi and 200,000 psi at formation conditions, and most typically between about 7,000 and 150,000 psi at formation conditions. The Young's modulus of the aggregate is substantially higher than the Young's modulus of the organic lightweight material or the weighting agent.

Those of skill in the art will understand that selection of suitable proppant will depend, in part, on the density of the fluid of the proppant-laden slurry and on whether it is desired that the selected proppant particle be relatively lightweight or substantially neutrally buoyant in the selected fluid, and/or whether or not it is desired that the fluid be non-gelled or non-viscosified.

The initial proppant-free fluid, as well as the proppant-laden slurry, may also contain other conventional additives common to the well service industry such as breakers, surfactants, biocides, gelling agents, hardening agents, solvents, foaming agents, demulsifiers, buffers, clay stabilizers, acids, or mixtures thereof.

In light of the differences in the fluid properties between the proppant-free fluid and the proppant-laden slurry, the proppant-laden slurry overrides the heavier proppant-free fluid, which has migrated down into the fracture growth created below the productive zone. As such, the conductivity of water inflow below the productive zone of the formation is reduced. Once pumping is completed and the fracture closes, the areas below the productive zone remain unpropped and thus have a much lower conductivity to inflow of bottom water.

The method of the invention has particular applicability in limiting undesirable fracture height growth in the hydrocarbon-bearing subterranean formation. Since the fracture, initiated by the introduction of the proppant-free fluid, grows below the productive zone of the formation, the proppant-free slurry migrates to the lower extremities of the initiated fracture. Such growth proceeds by gravity segregation. The density differential of the proppant-free fluid and the proppant laden slurry allows the proppant laden slurry to override the dense proppant-free fluid, thereby causing a separation of the proppant laden slurry from the proppant-free fluid. After the fracture is closed, the area below the fracture of the productive zone is unpropped. As a result, the conductivity of inflow of water below the productive zone of a subterranean formation is reduced.

The following examples will illustrate the practice of the present invention in its preferred embodiments. Other embodiments within the scope of the claims herein will be apparent to one skilled in the art from consideration of the specification and practice of the invention as disclosed herein. It is intended that the specification, together with the examples, be considered exemplary only, with the scope and spirit of the invention being indicated by the claims that follow.

EXAMPLES

The Examples demonstrate the ability of the process of the invention to control water production.

A fracture was simulated using the Mfrac three-dimensional hydraulic fracturing simulator of Meyer & Associates, Inc. using a simple 3-layer isotropic homogeneous 0.1 mD permeability gas reservoir model, 40 acre spacing. The fracture was designed to be placed into the zone at a theoretical depth of approximately 9800 to about 9900 feet and the model was run in full 3-D mode. Since the Mfrac model does not make calculations for a partial monolayer, the conductivity of the proppant was artificially increased at a concentration of 0.5 lbs/sq. ft. at a rate of 50 barrels per minute (bpm).

Figure 2:
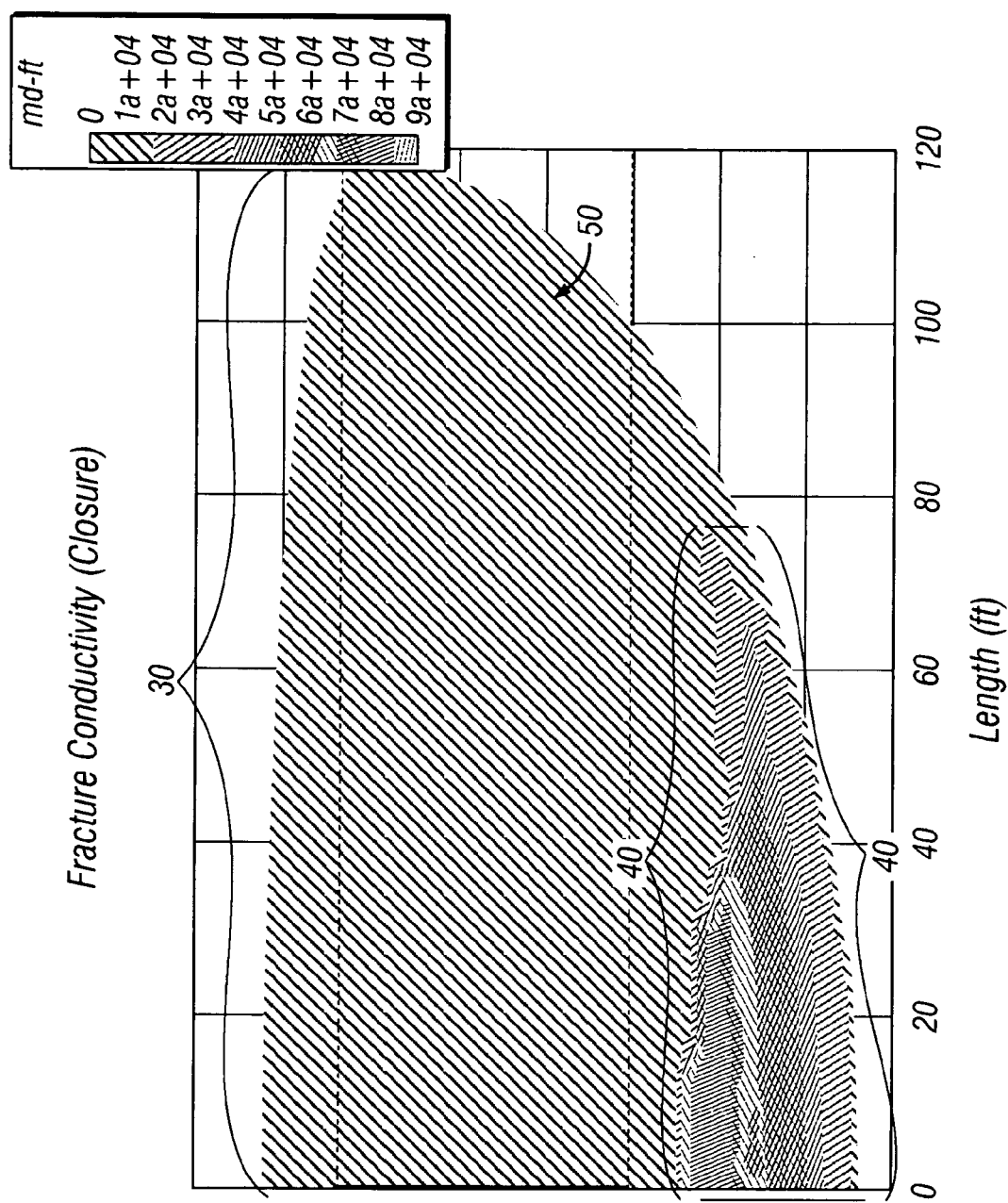
Figure 3:
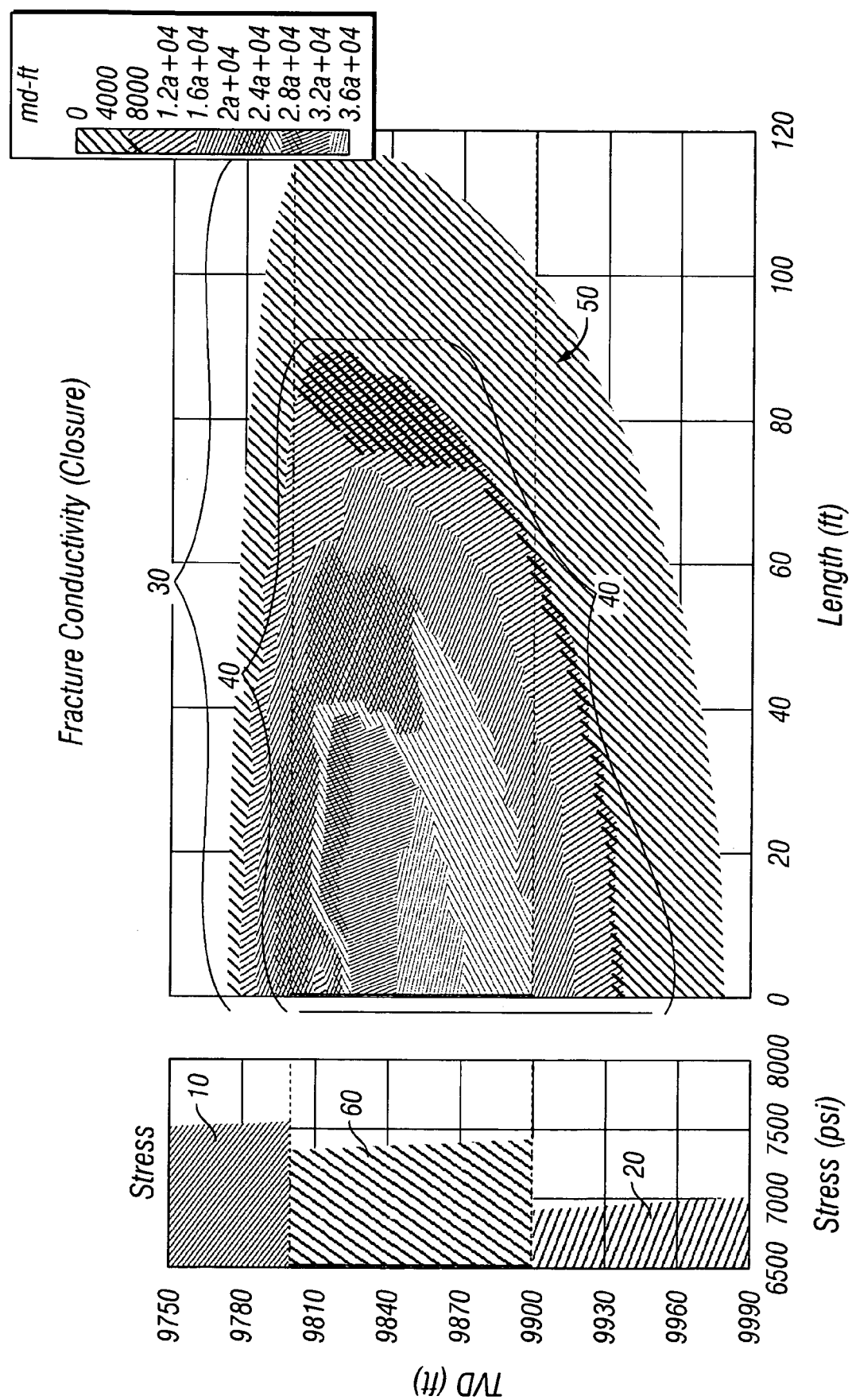
FIG. 3 is a depiction of a fracture, after closure of the fracture, initiated with a pre-pad fluid, followed by a slickwater brine containing an ultra lightweight proppant.

Fracture conductivity between the proppant-packed fracture and that of the native reservoir, mathematically defined as:

(proppant pack permeability×fracture width)/(formation permeability×propped fracture half length), is illustrated in the conductivity profiles of FIGS. 1, 2 and 3 after closure of the fracture. FIG. 1 is a 2D depiction of the fracture of injection of the fracturing fluid using sand as the proppant and a standard 8.4 ppg brine slickwater fluid. FIG. 2 displays an identical job design except that a 10 ppg densified slickwater brine was used in place of the 8.4 ppg brine as fracturing fluid. FIG. 3 displays the same job design but use of a pre-pad fluid of 10 ppg slickwater brine and the remaining fluid being 8.4 ppg slickwater brine containing LiteProp™ 125 lightweight proppant, a product of BJ Services Company, having a density of 1.25 g/cc. The amount of LiteProp™ 125 is volumetrically equivalent to the jobs set forth in FIG. 1 and FIG. 2. In all three of the fracture designs, an identical pump schedule was used in terms of fluid volumes; the proppant mass was adjusted for density differences to yield equivalent proppant volumes for each job design.

The left hand portion of the figures shows a simulated stress profile that could be prevalent in cases where a water-bearing lower zone might be present. The upper zone 10 on the stress profile is a shale zone with a confining stress that will tend to contain the fracture from growing up too high. The lower zone, 20, on the other hand, has a lower stress profile that invites the fracture to propagate into it.

The created fracture area, represented as 30, is the area of the reservoir traversed by the brine slickwater fluid. The propped fracture area, 40, is contributory to well stimulation, and represents the area of the reservoir propped open to provide improved fracture conductivity. The created but unpropped area 50, heals upon fracture closure and, thus, is not considered to be stimulated.

As evidenced in FIG. 1, the sand proppant settles in lower zone 20, thereby stimulating the water producing zone while providing little, if any, benefit to the productivity of the zone of interest 60. The ultimate result of the fracture is very high water production, and little or no hydrocarbon production. Little difference between the simulations of FIG. 1 and FIG. 2 can be detected. The additional brine density modifies proppant transport somewhat, but overall the results are very similar. As set forth in FIG. 3, the densified 10 ppg slickwater brine migrates toward the bottom of the fracture, allowing the ultra lightweight density (8.4 ppg slickwater) brine to override the higher density brine and stay mostly in zone of interest 60. This process effectively limits, if not eliminates, water production from an adjacent water zone below the zone of interest and shows no increase in conductivity in the water producing zone.

Other embodiments within the scope of the claims herein will be apparent to one skilled in the art from consideration of the specification and practice of the invention as disclosed herein. It is intended that the specification be considered exemplary only, with the scope and spirit of the invention being indicated by the claims which follow.

What is claimed is:

1. A method of hydraulically fracturing a hydrocarbon-bearing subterranean formation and reducing unwanted water production resulting therefrom, the method comprising:
    (a) introducing a proppant-free fluid into the subterranean formation for a time and at an injection rate sufficient to initiate fracturing in and below the productive zone of the subterranean formation;
    (b) introducing into the subterranean formation a proppant laden slurry containing relatively lightweight density proppant;
    wherein at least one of the following conditions prevail:
        (i.) the fluid density of the proppant-free fluid is greater than the fluid density of the proppant laden slurry; or
        (ii) the viscosity of the proppant-free fluid is greater than the viscosity of the proppant laden slurry
        wherein, subsequent to fracturing, the area below the productive zone exhibits lower conductivity to the inflow of bottom water and no increase in fracture conductivity.

2. The method of claim 1, wherein the density of the relatively lightweight density proppant is less than or equal to 3.25 g/cc.

3. The method of claim 2, wherein the relatively light density proppant is an ultra lightweight density proppant having a density less than or equal to 2.25 g/cc.

4. The method of claim 3, wherein the density of the ultra lightweight density proppant is less than or equal to 1.75 g/cc.

5. The method of claim 4, wherein the density of the ultra lightweight density proppant is less than or equal to 1.25 g/cc.

6. The method of claim 1, wherein the relatively lightweight density proppant is selected from ceramics, resin coated ceramics, glass microspheres, sintered bauxite, resin-coated sintered bauxite, aluminum pellets, aluminum needles, nylon pellets, ground or crushed shells of nuts, seed shells crushed fruit pits, or processed wood materials or a mixture thereof.

7. The method of claim 1, wherein the relatively lightweight density proppant is a selectively configured porous particulate or a well treating aggregate.

8. The method of claim 1, wherein the fracture in the subterranean formation is initiated by a fluid which contains a breaker, surfactant, biocide, gelling agent, curable resin, hardening agent, solvent, foaming agent, demulsifier, buffer, clay stabilizer, acid, or a mixture thereof.

9. The method of claim 1, wherein the fracture in the subterranean formation is initiated by a fluid which comprises salt water, fresh water, liquid hydrocarbon, and/or nitrogen or other gases.

10. The method of claim 9, wherein the fracture in the subterranean formation is initiated by a fluid which comprises salt water or fresh water.

11. The method of claim 1, wherein the fluid introduced to the formation in step (a) is weighted.

12. The method of claim 11, wherein the weighted fluid introduced to the formation in step (a) further comprises a water control additive.

13. The method of claim 11, wherein the weighted fluid introduced to the formation in step (a) further comprises a relative permeability modifier.

14. The method of claim 1, wherein the proppant-free fluid comprises slickwater brine.

15. The method of claim 14, wherein the proppant laden slurry comprises slickwater brine.

16. A method of limiting undesirable fracture height growth and water production in a hydrocarbon-bearing subterranean formation during hydraulic fracturing, the method comprising:
  (a) initiating a hydraulic fracture that grows below the productive zone of the formation by pumping a dense liquid into the formation for a time sufficient for the liquid to migrate to the lower extremities of the initiated fracture by gravity segregation;
  (b) introducing into the formation a proppant laden slurry containing a relatively lightweight density proppant, the density and/or viscosity of the relatively lightweight density proppant being less than the density and/or viscosity of the liquid of step (a); and
  (c) allowing the proppant slurry to override by density differential the liquid pumped into the formation in step (a) for a time sufficient so as to separate the proppant slurry from the liquid pumped into the formation in step (a); and
thereby limit water production from a water zone below the productive zone.

17. The method of claim 16, wherein the density of the relatively lightweight density proppant is less than or equal to 3.25 g/cc.

18. The method of claim 17, wherein the relatively lightweight density proppant is an ultra lightweight density proppant having a density less than or equal to 2.25 g/cc.

19. The method of claim 18, wherein the density of the ultra lightweight density proppant is less than or equal to 1.75 g/cc.

20. The method of claim 19, wherein the density of the ultra lightweight density proppant is less than or equal to 1.25 g/cc.

21. The method of claim 16, wherein the relatively lightweight density proppant is selected from ceramics, resin coated ceramics, glass microspheres, sintered bauxite, resin-coated sintered bauxite, aluminum pellets, aluminum needles, nylon pellets, ground or crushed shells of nuts, seed shells crushed fruit pits or processed wood materials or a mixture thereof.

22. The method of claim 16, wherein the relatively lightweight density proppant is a selectively configured porous particulate or a well treating aggregate.

23. The method of claim 16, wherein the fracture in the subterranean formation is initiated by a fluid which contains a breaker, surfactant, biocide, gelling agent, curable resin, hardening agent, solvent, foaming agent, demulsifier, buffer, clay stabilizer, acid, or a mixture thereof.

24. The method of claim 16, wherein the fracture in the subterranean formation is initiated by a fluid which comprises salt water, fresh water, liquid hydrocarbon, and/or nitrogen or other gases.

25. The method of claim 24, wherein the fracture in the subterranean formation is initiated by a fluid which comprises salt water or fresh water.

26. The method of claim 25, wherein the proppant laden slurry comprises slickwater brine.

27. The method of claim 16, wherein the fluid introduced to the formation in step (a) is weighted.

28. The method of claim 27, wherein the weighted fluid introduced to the formation in step (a) further comprises a water control additive.

29. The method of claim 27, wherein the weighted fluid introduced to the formation in step (a) further comprises a relative permeability modifier.

30. A method of limiting or eliminating the conductivity of inflow of water below the productive zone of a subterranean formation, comprising the steps of:
  (a) initiating a hydraulic fracture in and below the productive zone of the formation by pumping a liquid into the formation for a time sufficient for the liquid to migrate to the initiated fracture growth;
  (b) introducing into the formation a proppant laden slurry containing a relatively lightweight density proppant, the density and/or viscosity of the relatively lightweight density proppant being less than the density and/or viscosity of the liquid of step (a);
  (c) allowing the proppant slurry to override the liquid pumped into the formation in step (a) for a time sufficient so as to separate the proppant laden slurry from the liquid pumped into the formation in step (a); and
  (d) closing the fracture such that the area below the fracture of the productive zone is unpropped and exhibits no increase in fracture conductivity.

31. The method of claim 30, wherein the fracture in the subterranean formation is initiated by a fluid which comprises salt water or fresh water.

32. The method of claim 31, wherein the proppant laden slurry comprises slickwater brine.

33. A method of hydraulically fracturing a hydrocarbon-bearing subterranean formation and reducing unwanted water production resulting therefrom, the method comprising:
  (a) introducing a proppant-free weighted brine into the subterranean formation for a time and at an injection rate sufficient to initiate fracturing in and below the productive zone of the formation;
  (b) introducing into the subterranean formation a proppant laden slurry comprising a resin coated ultra lightweight ceramic
wherein at least one of the following conditions prevail:
    (i.) the fluid density of the weighted brine is greater than the fluid density of the proppant laden slurry; or
    (ii) the viscosity of the weighted brine is greater than the viscosity of the proppant laden slurry wherein, subsequent to fracturing, the area below the productive zones exhibits lower conductivity to the inflow of the bottom water and no increase in fracture conductivity.

* * * * *